(12) United States Patent
Marek et al.

(10) Patent No.: US 12,479,419 B2
(45) Date of Patent: Nov. 25, 2025

(54) METHOD FOR AUTOMATICALLY PARKING A VEHICLE

(71) Applicant: Volkswagen Aktiengesellschaft, Wolfsburg (DE)

(72) Inventors: Gregor Marek, Wendeburg (DE); Markus Schaper, Peine (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 752 days.

(21) Appl. No.: 17/633,045

(22) PCT Filed: Jun. 16, 2020

(86) PCT No.: PCT/EP2020/066650
§ 371 (c)(1),
(2) Date: Feb. 4, 2022

(87) PCT Pub. No.: WO2021/023420
PCT Pub. Date: Feb. 11, 2021

(65) Prior Publication Data
US 2022/0274588 A1  Sep. 1, 2022

(30) Foreign Application Priority Data
Aug. 5, 2019 (DE) .......................... 102019211681.7

(51) Int. Cl.
*B60W 30/06* (2006.01)
*G01C 21/34* (2006.01)
*G06V 20/56* (2022.01)

(52) U.S. Cl.
CPC ......... *B60W 30/06* (2013.01); *G01C 21/3476* (2013.01); *G06V 20/56* (2022.01)

(58) Field of Classification Search
CPC . B60W 30/06; G01C 21/3476; G01C 21/165; G06V 20/56; B62D 15/0285
See application file for complete search history.

(56) References Cited

U.S. PATENT DOCUMENTS 8,229,645 B2 * 7/2012 Lee .................... B62D 15/0285
701/96
10,409,290 B2   9/2019 Mielenz
(Continued)

FOREIGN PATENT DOCUMENTS

CN      102815297 A    12/2012
CN      107074282 A     8/2017
(Continued)

OTHER PUBLICATIONS

PCT/EP2020/066650. International Search Report (Sep. 17, 2020).
(Continued)

*Primary Examiner* — Peter D Nolan
*Assistant Examiner* — Demetra R Smith-Stewart
(74) *Attorney, Agent, or Firm* — Peter Zura; LOZA & LOZA, LLP

(57) ABSTRACT

Technologies and techniques for automatically parking a vehicle. A user input determined, relating to a defined parking position, and a parking data set is determined, relating to the defined parking position in response to the user input. The parking data set may include the position of a starting region for an automatic guidance of the vehicle to the defined parking position. Trajectory information is obtained for an automatic guidance of the vehicle from the starting region to the defined parking position. The trajectory information may include a plurality of odometry data items relating to the lateral and longitudinal guidance of the vehicle along the trajectory and image data-based surroundings data of a driving path of the trajectory. A related vehicle and corresponding computer program is further disclosed.

20 Claims, 2 Drawing Sheets

(56) References Cited

U.S. PATENT DOCUMENTS

| | | | |
|---|---|---|---|
| 10,829,154 B2 | 11/2020 | Albrecht et al. | |
| 2011/0080304 A1* | 4/2011 | Toledo | G08G 1/165 |
| | | | 701/41 |
| 2018/0246515 A1 | 8/2018 | Iwama et al. | |
| 2020/0148263 A1* | 5/2020 | Imai | B60W 30/06 |
| 2020/0369204 A1* | 11/2020 | Suzuki | G08G 1/143 |
| 2022/0274588 A1* | 9/2022 | Marek | B62D 15/0285 |

FOREIGN PATENT DOCUMENTS

| | | | |
|---|---|---|---|
| CN | 107209518 A | | 9/2017 |
| DE | 102013015348 A1 | | 4/2014 |
| DE | 102013201799 A1 | | 8/2014 |
| DE | 102014016237 A | | 6/2015 |
| DE | 102016222258 A1 | * | 5/2018 |
| DE | 102016222259 A1 | | 5/2018 |
| EP | 3444637 A1 | * | 2/2019 |
| GB | 2491720 A | | 12/2012 |

OTHER PUBLICATIONS

DE102019211681.7 Office Action dated Mar. 31, 2020.
DE102019211681.7 Office Action dated Feb. 18, 2021.
Corresponding Chinese Application No. 202080051091.5. Office Action (May 31, 2024).

* cited by examiner

METHOD FOR AUTOMATICALLY PARKING A VEHICLE

RELATED APPLICATIONS

The present application claims priority to International Patent App. No. PCT/EP2020/066650 to Marek et al., filed Jun. 16, 2020, which further claims priority to German Pat. App. No. 10 2019 211 681.7 filed Aug. 5, 2019, the contents of each being incorporated by reference in their entirety herein.

TECHNICAL FIELD

Aspects of the present disclosure are directed to technologies and techniques for automatically parking a vehicle, in particular methods for automated parking of the vehicle at a parking position repeatedly approached by a user. The present disclosure also relates to a vehicle configured to carry out the methods according to the present disclosure and to a computer program.

BACKGROUND

Today's vehicles already have a large number of assistance systems that provide computer-based support to the driver in a large number of driving situations. Such assistance systems can use sensors to record a large number of measurement data, which by far exceed the human senses. In addition, the speed of these assistance systems significantly exceeds human reaction times. Known driver assistance systems are, for example, lane keeping assistants, brake assistants for pedestrian detection and adaptive cruise control systems, for example for traffic jam situations.

By using such assistance systems, the driver's autonomy with regard to his driving decisions is increasingly transferred to the vehicle or to the control units operating in it. At the end of these developments there is an automatically driving vehicle that can maneuver completely without human intervention. As a projection of driver assistance systems, however, automated driving is primarily used for fully automated passenger transport. In addition, however, automatic driving is also to be increasingly used in parking processes, since these in particular benefit from the precision of the computer-aided sensor detection and the steering processes based on it.

Up until now, automatic parking has generally required an empty parking space to be measured beforehand, for example by driving the vehicle past the empty parking space once. On the basis of the measurement results obtained, the size of a parking position and the degree of freedom of the vehicle for maneuvering are then ascertained. Novel concepts, on the other hand, are based on learning familiar trajectories, for example to automatically drive a vehicle from a property entrance into a garage. To this end, it is generally necessary for a user to activate a corresponding mode and then complete at least one training run in order to save the trajectory in the vehicle. The trajectory is usually stored in the vehicle in the form of odometry data.

Saving the learned trajectories solely on the basis of odometry data usually makes it necessary to define a fixed starting region for the automatic parking process. As a rule, this starting region always corresponds to the starting region selected by the user during training and is therefore often not an ideal starting region for automatic guidance of the vehicle. In addition, the defined starting region for initiating automatic guidance of the vehicle must be hit exactly, which presents difficulties for some users.

BRIEF SUMMARY

The present disclosure is therefore based on aspects of overcoming the disadvantages of the prior art and of enriching the prior art with an alternative method for automated parking, which, with good results, enables simplification of both the learning and the initiation of automated parking processes for a user.

Aspects of the present disclosure are described in the subject matter disclosed in the subject matter of the independent claims. Preferred further developments are described in the subject matter of the respective dependent claims.

In some examples, a method is disclosed for automatically parking a vehicle. The method is preferably carried out or monitored by a control unit of the vehicle. The control unit therefore carries out the steps of the method according to the present disclosure itself, or may control other components for carrying out the respective method steps. It is also preferred to outsource steps of the method according to the present disclosure, in particular with regard to the calculation and storage of larger amounts of data, to a high-performance network server. In such an embodiment, the method according to the present disclosure comprises the corresponding steps for communication between a vehicle and a network server.

In a first step of the method according to the present disclosure, a user input of a user relating to a defined parking position is ascertained. This user input is preferably made via an input device in the vehicle or via peripheral devices connected to the vehicle, such as smartphones or the like. The user input is likewise preferably carried out in response to an input request output to the user. In the method according to the present disclosure, the user input preferably relates to training (defining) or calling up an already defined parking position.

In a further step of the method according to the present disclosure, a parking data set for the defined parking position is ascertained in response to the user input. The ascertainment is preferably carried out for the first time or repeatedly. According to the present disclosure, the parking data set ascertained has at least the following components. On the one hand, the parking data set has a position of a starting region of automated guidance of the vehicle to the defined parking position. The starting region is preferably defined by at least one absolute geographic coordinate and an area around the coordinate. The starting region is also preferably defined by a plurality of geographic coordinates as a coherent geographic area. The method according to the present disclosure therefore does not use a fixed starting point but a starting region.

Furthermore, the parking data set ascertained in response to the user input may include trajectory information from an automated guidance of the vehicle from the starting region to the defined parking position. The trajectory information is the data defined for the automatic maneuvering of the vehicle from the starting region to the parking position. In some examples, the trajectory information includes a plurality of odometry data relating to the lateral and longitudinal guidance of the vehicle along the trajectory, e.g., from the starting region to the defined parking position. The odometry data may relate, for example, to time series of steering locks and accelerations or the like. The odometry data are particularly preferably defined in such a way that they enable the automated guidance of the vehicle from a fixed starting region to the defined starting position.

Other aspects of the present disclosure relate to a computer program comprising commands which, when the program is executed by a computer, such as a control unit of a vehicle, cause the computer to carry out the presently disclosed steps of the vehicle in the method according to the present disclosure. Preferred developments of the vehicle, the control unit and the computer program correspond to the preferred embodiments explained and claimed for the method according to the present disclosure.

Aspects of the methods according to the present disclosure can be implemented by electrical or electronic parts or components (hardware), by firmware (ASIC), or by executing a suitable program (software). Methods according to the present disclosure is likewise preferably realized or implemented by a combination of hardware, firmware and/or software.

For example, individual components for performing individual method steps may be configured as a separately integrated circuit or are arranged on a common integrated circuit. Individual components designed to carry out individual method steps are furthermore preferably arranged on a (flexible) printed circuit carrier (FPCB/PCB), a tape carrier package (TCP) or another substrate. The individual method steps of the method according to the present disclosure are further preferably configured as one or more processes that run on one or more processors in one or more electronic computing devices and are generated when one or more computer programs are executed. The computing devices are preferably configured to work together with other components, for example a communication module, and possibly one or more sensors, in order to realize the functionalities described herein. The instructions of the computer programs are preferably stored in a memory, such as a RAM element. However, the computer programs can also be filed in a non-volatile storage medium such as a CD-ROM, a flash memory or the like.

A person skilled in the art can also understand that the functionalities of multiple computers (data processing devices) can be combined or combined in a single device or that the functionality of a specific data processing device can be distributed across a large number of devices in order to execute the steps of the method according to the present disclosure without deviating from the method according to the present disclosure.

The various embodiments of the present disclosure mentioned in this application can advantageously be combined with one another, unless stated otherwise in the individual case.

BRIEF DESCRIPTION OF THE DRAWINGS

The present disclosure is explained below in exemplary embodiments with reference to the accompanying drawings.

DETAILED DESCRIPTION

Figure 1:
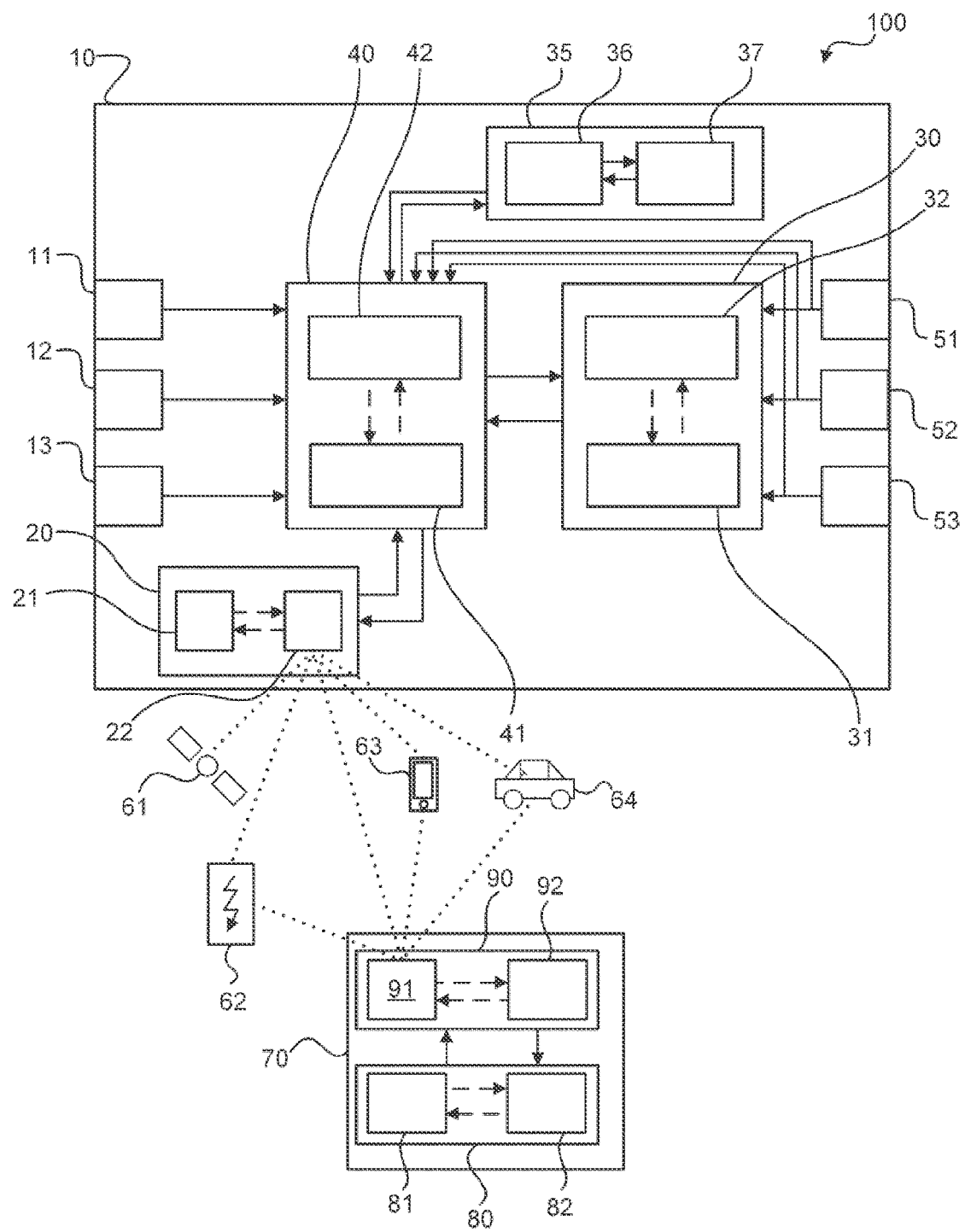
FIG. 1 shows a schematic representation of a system from a vehicle and a network server according to some aspects of the present disclosure.

In various examples disclosed herein, trajectory information may include surroundings data, based on image data, of a driving path of the trajectory. In other words, the trajectory information may include additional information on the surroundings of the vehicle for each or at least for a large number of points along the trajectory, wherein the additional information may be obtained using image data. The surroundings data based on image data may be obtained based on continuous image recordings of the surroundings while driving along the trajectory. Alternatively, the surroundings data based on image data may be obtained based on camera images recorded discontinuously along the trajectory. The image data-based surroundings data of a driving path of the trajectory thus have additional information on the surroundings of the trajectory, an extension of the recorded driving path corresponding to a detection angle of the imaging sensors used to capture the image data.

The use of image data-based surroundings data of a driving path of the trajectory from the starting region to the defined parking position advantageously enables automatic guidance of the vehicle to begin within an extended starting region or even at any point at a certain distance from the driving path of the trajectory, as explained in detail below. Furthermore, the trajectory information according to the present disclosure advantageously enables an improved transfer from manual vehicle navigation to automatic guidance of the vehicle, as will be explained below.

In some examples, additional data for determining the trajectory information may be used for automatic parking. The image data may include image data for a large number of points along the trajectory, for example, for each point of the trajectory. In other words, the discontinuously or continuously recorded image data (photo/video) described above may be stored directly in the trajectory information. A maximum information content of the image data is thus advantageously obtained.

In some examples, the image data may be configured with a 3D point cloud for a large number of points along the trajectory for each point of the trajectory. The 3D point cloud may be ascertained by means of the imaging sensors, for example in coordination with a laser measuring device, and with a smaller file size still constitutes a detailed representation of the surroundings with a high level of information. Each point is preferably stored with its absolute coordinates in space.

The image data may also include structural data of the driving path for a large number of points along the trajectory, particularly preferably for each point of the trajectory. The structural data may be ascertained by segmentation and/or structure or object recognition based on the image data or the 3D point cloud. The structural data may include, for example, information on the position and alignment of characteristic edges and/or on the position and extent of characteristic surfaces. The structural data thus advantageously enable a further reduction in the data size or the storage requirement for the surroundings data of the driving path based on image data. This is advantageous with regard to a method carried out by the vehicle.

In some examples, the surroundings data based on image data stored in the trajectory information enable a comparison with subsequently acquired surroundings data based on image data. The surroundings data are therefore selected or stored in such a way that they can be used during automatic guidance of the vehicle to ascertain a vehicle position by comparing the stored surroundings data with currently captured image data or current surroundings data derived therefrom. The use of trajectory information that is at least partially based on image data should be taken into account both when training the vehicle, e.g., when defining a parking position, and when approaching a defined parking position.

The stored surroundings data based on image data advantageously enable a vehicle to be guided with significantly higher precision.

In some examples, the vehicle may be manually guided laterally and longitudinally by a user, meaning that the vehicle is not operated automatically. This manual guidance of the vehicle is not necessarily a manual guidance of the vehicle related to a parking process. Manual guidance of the vehicle may also be recorded, where recorded data for manual guidance of the vehicle are stored for a sliding interval. In other words, the manual guidance of the vehicle is recorded for a sliding interval before a current point in time or a current point on the route. The sliding time window is preferably a sliding time window and/or a sliding route section. The manual guidance of the vehicle may be always recorded for a fixed period of time before a current point in time, for example for the past 30 s, 1 min, 5 min or the like. Likewise, manual guidance of the vehicle may be recorded and stored for a fixed route section before a current position, for example for the last 50 m, 100 m or 500 m driven.

The end of manual guidance of the vehicle may also be recognized at a parking position. The recognition of the completion of manual guidance of the vehicle does not necessarily relate to the switch to automatic guidance of the vehicle, but rather to a user request to park the vehicle. There are a number of indicators for the completion of manual vehicle driving, such as switching off the engine, loosening the seat belt, opening the trunk, staying near a destination of navigation, recognizing a stored WLAN network, signals from seat pressure sensors or the like. In some examples, a plurality of these indicators may be used to recognize the completion of manual guidance of the vehicle. Methods for recognizing the parking of a vehicle are already known to the person skilled in the art in connection with other parking functions; a more detailed description is therefore omitted for the purpose of brevity.

If the completion of manual guidance of the vehicle is recognized, an input request may be output to the user in response to this. The output is preferably carried out optically and/or acoustically through display means in the vehicle and/or through a mobile terminal device, for example a smartphone, belonging to the user. The input request relates to the storage of the current parking position of the vehicle as a defined parking position of the method according to the present disclosure. The user is therefore asked whether an automatic parking process for the current parking position is desired in the future. In response to the input request, the user input already mentioned above is ascertained by the user. In this example, the user input therefore contains information as to whether or not the current parking position is to be recorded as a parking position defined according to the present disclosure for automatic parking.

In some examples, in response to the user input in which the current parking position is to be recorded as the parking position defined for automatic parking, the above-mentioned ascertainment of the parking data set for the defined parking position also takes place. The above-defined parking data set including the position of a starting region and the trajectory information is ascertained on the basis of the stored data for manual guidance of the vehicle, that is, based on the data for manual guidance of the vehicle stored for the sliding interval. The storage of data for manual guidance of the vehicle thus advantageously enables a user to select a current parking position that has already been taken without the user having to define a starting region for automated parking as part of the learning process. This minimizes operating errors by the user.

In some examples, the input request includes further information and/or the output of the input request is linked to further conditions. The input request preferably contains information on the recorded manual guidance of the vehicle in the sliding interval. For example, the trajectory traveled in the sliding interval is shown superimposed on a map. The input request particularly preferably enables a selection of data to be used to ascertain the parking data set from the recorded data for manual guidance of the vehicle. Thus, a user can, for example, select a starting region of the automatic guidance of the vehicle along the recorded trajectory, and consequently select a sub-region of the recorded trajectory. Preferably, only one point of the trajectory can be selected to define a starting region for which the stored data for manual guidance of the vehicle have a GPS position.

Furthermore, in response to the input request, a user can preferably make corrections to a recorded trajectory of the manual guidance of the vehicle with his user input, for example increase the distance between the trajectory and an obstacle that has been driven around. However, such a correction is possible only within the driving path of the trajectory defined by the captured image data. Alternatively, before the input request is output, a check is preferably carried out as to whether the manual guidance of the vehicle in the sliding interval passed one or more obstacles at a distance below a predetermined limit value. If this is ascertained, the recorded trajectory of manual guidance of the vehicle may not be suitable for automatic guidance of the vehicle and preferably no input request is output to the user.

In some examples, the stored data for manual guidance of the vehicle include odometry data, position data and image data of a driving path of the vehicle along the trajectory of the manual guidance of the vehicle. The database required for determining a parking data set may thus be advantageously created. For this purpose, the odometry data preferably have sensor data on steering locks and accelerations of the vehicle. The image data preferably have images of the surroundings of the vehicle captured with one or more cameras, particularly preferably a front camera, of the vehicle. The position data preferably have GPS coordinates of the vehicle, provided that these were detectable along the trajectory of the manual guidance of the vehicle.

Likewise, the data on the manual guidance of the vehicle that took place in the sliding interval may be stored in a ring memory. In other words, previously stored data for manual guidance of the vehicle are always overwritten with newly stored data for manual guidance of the vehicle. The overwritten data are outside the set sliding time window. The use of a ring memory advantageously represents a resource-saving and, from the point of view of data protection, permissible implementation of the continuous storage of data for manual guidance of the vehicle.

In some examples, the data for manual guidance of the vehicle are also stored for a fixed interval before the recognized completion of manual guidance of the vehicle. In other words, the data stored for the sliding interval before the recognized end of manual guidance of the vehicle are permanently stored in a memory, for example taken from the ring memory of the vehicle and stored in a non-volatile memory. Thus, the recognition of the completion of manual guidance of the vehicle, e.g., the recognition of a parking of the vehicle, always has the effect that data recorded for a period of time and/or a route before parking are stored, at least temporarily, in the vehicle.

There may also be a comparison of the permanently filed (stored) data with data previously permanently stored in the same way for manual guidance of the vehicle for a fixed interval before a previously recognized end of manual guidance of the vehicle. In other words, on the basis of data sets for guidance of the vehicle that are automatically stored after the detection of a parking process, it is checked whether the same parking process has already been carried out several times by the user. The ascertainment of such a repeatedly carried out parking process on the basis of the guidance of the vehicle data is advantageous compared to the comparison of GPS positions, which are not always available in buildings, for example. A GPS position recorded just before the recognized parking (completion of manual guidance of the vehicle) is, however, preferably used to preselect the stored data sets to be compared with one another.

If, according to this example, a match between the compared data for manual guidance of the vehicle is ascertained, a preliminary parking data set for a defined parking position is preferably ascertained on the basis of the data for manual guidance of the vehicle ascertained to be consistent. A match is preferably ascertained by comparing the recorded odometry, GPS and/or image data, with the identity of the compared data not necessarily being required. The ascertainment of a preliminary parking data set preferably requires the ascertainment of at least two or more, preferably at least three, four or five, matching data sets.

For each compared data category, e.g., odometry, GPS positions and image data, a quality measure is preferably defined that indicates a match between the respective data. If, according to this embodiment, no match with previously permanently stored data is ascertained, the currently permanently stored data is preferably provided with a time stamp and stored in the vehicle for a predetermined time and automatically deleted after the predetermined time has elapsed, for example after a week.

If a preliminary parking data set for a defined parking position has been ascertained, the next time the vehicle is localized in a starting region of an automated guidance of the vehicle to the defined parking position, in accordance with the preliminary parking data set the output of a prompt to the user, takes place. According to this embodiment, the starting region of the automatic guidance of the vehicle is preferably automatically ascertained in the preliminary parking data set, for example as the last recorded GPS position to the recorded parking position and/or at a fixed distance before the recorded parking position. Thus, after recognizing a certain number of comparable parking processes at a certain parking position and/or with comparable approach trajectories to the certain parking position, an input request is automatically output to the user as to whether this parking position should be saved as a defined parking position of the method according to the present disclosure for automated guidance of the vehicle. In response to this input request, the user input already mentioned above is ascertained. A positive user input preferably causes the preliminary parking data set to be stored as a permanent parking data set in the vehicle. A negative user input, on the other hand, preferably causes the stored provisional parking data set to be deleted and, if necessary, the setting of a flag that this parking position should not be saved in the future either.

The examples provided herein thus advantageously relate to training in a parking position defined according to the present disclosure or the data capture requirements necessary for this. Such configurations enable a user to create a defined parking position very comfortably, in particular after parking the vehicle, for example by means of the smartphone when removing from the vehicle. Automatic creation of the defined parking position after the user's consent to a provisionally ascertained parking position is particularly preferred.

Other aspects of the present disclosure relate to the selection of an already defined parking position as a navigation destination, by means of the user input described herein. In other words, a user does not select an address or a significant point, for example an airport, on a map as the destination of a navigation, but rather a previously defined parking position, for example as a private garage on the user's property or an underground parking space at a user's workplace. In response to the user input, according to the present disclosure, the parking data set already stored for the selected, defined parking position is ascertained, e.g., is retrieved from a memory in the vehicle.

In some examples, the position of the starting region of the parking data set ascertained for the selected, defined parking position, is used as a navigation target set for GPS-assisted navigation. A starting region of the parking data set is preferably ascertained via an absolute position, such as a GPS position. GPS-supported navigation to the starting region can therefore be carried out. In this embodiment, route guidance is also carried out until the navigation destination is reached. The route guidance takes place by outputting navigation instructions and/or maneuvering information to the driver in a known manner, so that a further description is not provided herein for the purposes of brevity.

The vehicle may also be guided automatically, starting from the starting region of the defined parking position and based on the trajectory information of the parking data set ascertained for the defined parking position. In other words, when the vehicle arrives in the starting region, it is transferred to automated parking based on the parking data set stored according to the present disclosure. The handover takes place preferably fully automatically when the vehicle position is detected in the starting region or in response to a user input, for example after an input request. The linking of the vehicle navigation with the automated guidance of the vehicle is thus based on the automatic assignment of the starting region of a defined parking position to a navigation system and the route guidance to the starting region of the defined parking position.

In this example, there may be an almost seamless transition from user-controlled guidance of the vehicle to automated guidance of the vehicle. However, driving the vehicle by a user is in principle prone to errors. In particular, the target area of a navigation usually has very large tolerance ranges in which the navigation is nevertheless considered to have ended successfully. Therefore, according to a further preferred embodiment, a GPS position of the vehicle is ascertained at the end of the route guidance and a relative spatial position of the vehicle and the position of the starting region of the defined parking position selected as the navigation destination are ascertained.

In this example, driving instructions based on the relative spatial position are also output to a user, and the driving instructions are ascertained in such a way that they indicate to the user that the vehicle is being driven into the starting region. In other words, the route guidance to the starting region is continued with a finer spatial resolution after the actual GPS-supported navigation has been completed, in order to enable the vehicle to be positioned as precisely as possible in the starting region. The driving instructions are preferably generated not by a classical navigation application but by the application for automated parking. If the user follows the driving instructions output and thus reaches the starting region with sufficient precision, the automated guidance of the vehicle is initiated according to this embodiment along the stored trajectory to the defined parking position, in particular with comparison of the surroundings data based on image data.

In some examples, a GPS position of the vehicle is also ascertained at the end of the route guidance. Instead of going to the starting region, according to this embodiment the vehicle is guided to the driving path of the trajectory stored in the parking data set. A relative spatial position of the vehicle and a capture range of the defined parking position are thus ascertained and driving instructions based on the relative spatial position are output to a user. If the user has reached the capture range, the automated guidance of the vehicle to the defined parking position is initiated again.

The capture range of this example includes the imaging area of imaging sensors of the vehicle along the trajectory from the starting region to the defined parking position. The imaging sensors are preferably the sensors which, in the method according to the present disclosure, record the image data on which the surroundings data are based. These surroundings data advantageously enable the vehicle to be placed on the trajectory to the defined parking position as soon as there is sufficient overlap between the currently captured image data of the vehicle and the surroundings data of the trajectory information according to the present disclosure. The parking data set according to the present disclosure thus advantageously enables the automated guidance of the vehicle to the stored parking position of the defined parking position to be started quickly even when the route guidance is terminated at a great distance from the starting region of the defined parking position.

Another aspect of the present disclosure relates to a vehicle, such as a passenger vehicle with a combustion engine, an electric engine or a hybrid engine which is designed to carry out the steps of a vehicle in the method according to the present disclosure. For this purpose, the motor vehicle has at least one first sensor configured to detect surroundings data and at least one second sensor configured to detect vehicle data.

In some examples, the at least one first sensor may be configured to detect sensor signals relating to the surroundings of the vehicle. The at least one second sensor is designed to detect sensor signals relating to the vehicle itself. A staggered by means of the ambient signal received by the at least one first sensor, the motor vehicle is preferably able to obtain information about its surroundings and preferably displays a large number of surroundings information. A surroundings signal received by means of the at least one second sensor preferably enables the motor vehicle to obtain information about its own surroundings and for this purpose preferably maps a large number of surroundings information items. The first sensors are, for example, imaging sensors, such as cameras, or distance sensors, such as LIDAR. The second sensors are, for example, wheel tachometers and the like.

The vehicle may also include a user interface with input means and output means, which is preferably a screen, particularly preferably a touch display, of an infotainment system of the vehicle. Alternatively, or additionally, a user interface may be made available via a mobile terminal device connected to the vehicle, in particular via a smartphone connected to the vehicle via a wireless connection. The vehicle can also have further input means, such as push buttons, rotary controls or the like, and further output means, such as loudspeakers or the like, which can also be used in the method according to the present disclosure.

The vehicle according to the present disclosure may also include a (first) communication module designed for communication with a mobile terminal. The communication module is designed in particular for communication via an air interface, for example a cellular network (4G, 5G), WLAN or the like. The communication module is also preferably designed and configured for communication with other vehicles, with a smart infrastructure and/or with a network server.

In some examples, the vehicle may also include a control unit which is designed to carry out the steps of the vehicle in the method according to the present disclosure. The control unit is configured to carry out the steps of the method according to the present disclosure itself or to control other components of the vehicle in order to carry out the steps. The control unit is designed in particular to ascertain a user input of a user relating to a defined parking position and to ascertain a parking data set for the defined parking position in response to the user input, the parking data set indicating a position of a starting region of an automated guidance of the vehicle system for the defined parking position and trajectory information an automated guidance of the vehicle from the starting region to the defined parking position and wherein the trajectory information comprises a plurality of the odometry data concerning the lateral and longitudinal guidance of the vehicle along the trajectory and image data-based surroundings data of a driving path of the trajectory.

Another aspect of the present disclosure relates to a control unit of a vehicle with at least one first sensor set up to capture surroundings data, at least one second sensor set up to capture vehicle data and a user interface having output means and input means, the control unit being set up to relate to a user input of a user to ascertain a defined parking position and to ascertain a parking data set for the defined parking position in response to the user input, the parking data set having a position of a starting region of an automated guidance of the vehicle of the vehicle to the defined parking position and trajectory information of an automated guidance of the vehicle from the starting region to the defined parking position, and wherein the trajectory information includes a plurality of odometry data relating to the lateral and longitudinal guidance of the vehicle along the trajectory and surroundings data based on image data of a driving path of the trajectory.

FIG. 1 shows a schematic representation of a system 100 according to the present disclosure comprising a vehicle 10 according to the present disclosure, which communicates with a network server 70. The reference number 10 denotes a block diagram of an exemplary vehicle 10, such as a two-track vehicle with a combustion engine, an electric engine or a hybrid engine. The vehicle 10 comprises a plurality of first sensors, in particular a first sensor 11, a second sensor 12 and a third sensor 13. The first sensors 11, 12, 13 are designed to detect data about the surroundings of the vehicle 10 and include, for example, a camera for capturing an image of the surroundings immediately surrounding the vehicle 10 or distance sensors, such as ultrasonic sensors or LIDAR, for detecting distances to objects surrounding the vehicle 10. The first sensors 11, 12, 13 transmit the surrounding signals detected by them to a first control unit 40 and to a driving system 30 of the vehicle 10.

The vehicle 10 further has a plurality of second sensors, in particular a fourth sensor 51, a fifth sensor 52, and a sixth sensor 53. The second sensors 51, 52, 53 are sensors for ascertaining status data relating to the vehicle 10 itself, such as current position and movement information of the vehicle 10. The second sensors are consequently, for example, speed sensors, acceleration sensors, inclination sensors, sensors for measuring an immersion depth of a shock absorber, wheel rotation sensors or the like. The second sensors 51, 52, 53 transmit the status signals detected by them to the first control unit 40 of the vehicle 10. In addition, the second sensors 51, 52, 53 transmit their measurement results directly to a driving system 30 of the vehicle 10.

The vehicle 10 further has a first communication module 20 with a memory 21 and one or more transponders or transceivers 22. The transponders 22 are radio, WLAN, GPS or Bluetooth transceivers or the like. The transponder 22 communicates with the internal memory 21 of the first communication module 20, for example via a suitable data bus. The first communication module 20 also communicates with the first control unit 40. In addition, the first communication module 20 is designed to communicate with a mobile network server 70, in particular a backend server of a vehicle manufacturer or its service partner. The first communication module 20 is further designed to communicate with a vehicle 64, which is configured in the same way as the vehicle 10. The communication module 20 is further configured to communicate with a mobile terminal 63 and with an electric charging station 62. The communication takes place in particular via a wireless interface, for example via WLAN, a cellular network (4G or 5G) vehicle-to-vehicle communication and the like.

The vehicle 10 also has the driving system 30, which is designed for fully autonomous driving operation, in particular for longitudinal and lateral guidance of the vehicle 10. The driving system 30 has a navigation module 32 that is used to calculate routes between a starting point and a destination point and is designed for ascertaining the maneuvers to be carried out by vehicle 10 along this route. The navigation module 32 is further preferably configured to carry out specific maneuvers of the vehicle 10, such as parking and pulling out maneuvers. In addition, the driving system 30 includes an internal memory 31 which communicates with the navigation module 32, for example via a suitable data bus. The functionality of the driving system 30 is controlled by the control unit 40.

The vehicle 10 further has a first control unit 40 which is designed to carry out the steps of the vehicle 10 in the method according to the present disclosure. The control unit 40 carries out the steps itself or controls the other components of the vehicle 10 accordingly. For this purpose, the first control unit 40 has an internal memory 41 and a CPU 42, which communicate with one another, for example via a suitable data bus. In addition, the first control unit 40 is in communication with at least the first sensors 11, 12, 13, the second sensors 51, 52, 53, the first communication module 20, the driving system 30 and the user interface 35, for example via one or more respective CAN connections, one or more respective SPI connections or other suitable data connections.

The vehicle 10 further has a user interface 35 with input means 36 for detecting a user input of a user and output means 37 for outputting a message, for example an input request, to a user. The user interface 35 is in particular a touchscreen of an infotainment system of the vehicle 10. In addition, at least the functionality of the user interface 35 can be provided via a smartphone 63 connected to the vehicle 10 via the communication module 20, in particular via an application (app) installed on it.

The network server 70 has a second control unit 80 which is set up to carry out computing operations in the method according to the present disclosure and has an internal memory 81 and a CPU 82 which communicate with one another via a suitable data bus. The network server 70 further has a second communication module 90. The second communication module 90 has a memory 92 and one or more transponders or transceivers 91. The transponders 91 are radio, WLAN, GPS or Bluetooth transceivers or the like. The transponder 91 communicates with the internal memory 92 of the second communication module 90, for example via a suitable data bus. The second communication module 90 is preferably designed to communicate via a cellular network. The charging station 62 and the mobile terminal 63 each also have a third or fourth communication module and a third or fourth control unit and are in communication with the network server 70 and the vehicle 10. The charging station 62 also has means for charging an energy store of an electric vehicle 10. The charging station 62 is preferably connected to an energy source or an energy store, preferably to a power grid.

Figure 2:
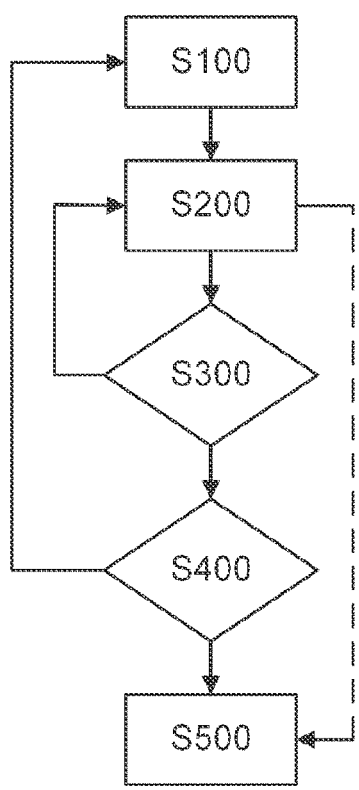
FIG. 2 shows a flow diagram of a method carried out in the system of FIG. 1 under some aspects of the present disclosure.

FIG. 2 shows a schematic flow diagram of a method according to the present disclosure carried out in the system according to the present disclosure according to one embodiment.

In a step S100 of the method, the vehicle is manually guided laterally and longitudinally by a user, e.g., where the user controls the vehicle 10. In step S200, the manual guidance of the vehicle is always recorded and the recorded data for manual guidance of the vehicle are stored for a sliding interval, in particular for a sliding time window of 5 min before a current point in time and/or for a sliding route section 50 m before the current position.

In step S300, automatic recognition takes place as to whether manual guidance of the vehicle has been completed at a parking position. If this recognition shows that the guidance of the vehicle has not been completed, the method goes over to step S200 again and data for manual guidance of the vehicle are also recorded and stored in a ring memory.

If, however, the completion of manual guidance of the vehicle at a parking position is recognized in step S300, an input request is output to the user via output means 37 of user interface 35 in step S400, with which the user is requested to make an input as to whether the current parking position is considered to be saved as a defined parking position. Furthermore, in step S400, the user input given in response to the input request is recorded by means of the input means 36 of the user interface 35.

If the user input from step S400 indicates that the user wishes to save the current parking position as a defined parking position, a parking data set according to the present disclosure with the position of a starting region and trajectory information on the defined parking position is ascertained and, based on the data stored in step S200 for manual guidance of the vehicle, stored in memory 41 of control unit 40.

LIST OF REFERENCE SYMBOLS 10 vehicle
11 first sensor
12 second sensor
13 third sensor
20 communication module
21 memory
22 transponder
30 driving system 31 memory
32 navigation module
35 user interface
36 input means
37 output means
40 control unit
41 memory
42 CPU
51 fourth sensor
52 fifth sensor
53 sixth sensor
61 satellite
62 charging station
63 mobile device (smartphone)
64 vehicle
70 network server
80 control unit
81 memory
82 CPU
90 communication module
91 transponder
92 memory
100 system

The invention claimed is:

1. A method for automatically parking a vehicle, comprising:
ascertaining a user input relating to a defined parking position;
ascertaining a parking data set for the defined parking position in response to the user input, the parking data set comprising:
(a) a position of a starting region of automated guidance of the vehicle to the defined parking position, wherein the starting region is determined based on a GPS-assisted location of the vehicle;
(b) trajectory information of an automated guidance of the vehicle from the starting region to the defined parking position, the trajectory information comprising
(i) a plurality of odometry data relating to the lateral and longitudinal guidance of the vehicle along the trajectory, and
(ii) surroundings data for a number of points along the trajectory comprising one or more of image data, a three-dimensional (3D) point cloud and/or structural data of a driving path of the trajectory; and
guiding the vehicle automatically from the starting region to the defined parking position in response to detecting the vehicle's position within the starting region, wherein the guidance is performed based on the trajectory information included in the parking data set.

2. The method according to claim 1, further comprising enabling a user to make a correction to a recorded trajectory of the vehicle, wherein the correction is constrained to remain within the driving path defined by the captured image data.

3. The method according to claim 1, further comprising:
receiving manual guidance of the vehicle;
detecting manual guidance of the vehicle and storing detected data on the manual guidance of the vehicle for a sliding interval;
recognizing completion of the manual guidance of the vehicle at the parking position;
outputting a request to the user to store the parking position as a defined parking position and ascertaining user input; and
ascertaining the parking data set for the defined parking position on the basis of the stored data for manual guidance data of the vehicle in response to the user input.

4. The method according to claim 3, wherein the stored data for manual guidance of the vehicle comprises odometry data, position data and image data of a driving path of the vehicle and/or are stored in a ring memory.

5. The method according to claim 3, further comprising:
storing the data for manual guidance of the vehicle for a fixed interval before the completion of manual guidance of the vehicle;
comparing the stored data with previously stored manual guidance data from a fixed interval before a previously recognized completion of a manual guidance of the vehicle;
ascertaining a preliminary parking data set for a defined parking position when the compared data for manual guidance of the vehicle match based on the matching data for manual guidance of the vehicle; and
outputting the input request in the starting region of automated guidance of the vehicle to the defined parking position according to the preliminary parking data set and ascertaining the user input in response to the input request.

6. The method according to claim 1, further comprising:
selecting a defined parking position as a navigation destination;
determining the position of the starting region of the ascertained parking data set relative to the defined parking position based on GPS-assisted navigation;
executing route guidance to reach the navigation destination; and
automatically guiding the vehicle from the starting region to the defined parking position based on the trajectory information of the parking data set.

7. The method according to claim 6, further comprising:
ascertaining the GPS position of the vehicle at an end of the route guidance;
ascertaining a relative spatial position of the vehicle to the starting region;
outputting driving instructions, based on the relative spatial position; and
initiating automated guidance of the vehicle when reaching the starting region.

8. The method according to claim 6, further comprising:
ascertaining a GPS position of the vehicle at an end of the route guidance;
ascertaining a relative spatial position of the vehicle and a capture range of the defined parking position and outputting driving instructions based on the relative spatial position to a user; and
initiating automated guidance of the vehicle when reaching the capture range, wherein the capture range comprises an imaging area of imaging sensors of the vehicle along the trajectory from the starting region to the defined parking position.

9. A vehicle for automatically parking a vehicle, comprising:
at least one first sensor configured to detect surroundings data;
at least one second sensor configured to detect vehicle data;
a user interface; and
a first control unit, operatively coupled to the at least one first sensor, at least one second sensor and the user interface, wherein the first control unit is configured to ascertain a user input relating to a defined parking position;
ascertain a parking data set for the defined parking position in response to the user input, the parking data set comprising:
  (a) a position of a starting region of automated guidance of the vehicle to the defined parking position, wherein the starting region is determined based on a GPS-assisted location of the vehicle;
  (b) trajectory information of an automated guidance of the vehicle from the starting region to the defined parking position, the trajectory information comprising
    (i) a plurality of odometry data relating to the lateral and longitudinal guidance of the vehicle along the trajectory, and
    (ii) surroundings data for a number of points along the trajectory comprising one or more of image data, a three-dimensional (3D) point cloud and/or structural data of a driving path of the trajectory; and
guide the vehicle automatically from the starting region to the defined parking position in response to detecting the vehicle's position within the starting region, wherein the guidance is performed based on the trajectory information included in the parking data set.

10. The vehicle according to claim 9, wherein the first control unit is further configured to enable a user to make a correction to a recorded trajectory of the vehicle, wherein the correction is constrained to remain within a driving path defined by image data captured by the at least one first sensor.

11. The vehicle according to claim 9, wherein the first control unit is configured to:
receive manual guidance of the vehicle;
detect manual guidance of the vehicle and storing detected data on the manual guidance of the vehicle for a sliding interval;
recognize completion of the manual guidance of the vehicle at the parking position;
output a request to the user to store the parking position as a defined parking position and ascertaining the user input; and
ascertain the parking data set for the defined parking position on the basis of the stored data for manual guidance data of the vehicle in response to the user input.

12. The vehicle according to claim 11, wherein the stored data for manual guidance of the vehicle comprises odometry data, position data and image data of a driving path of the vehicle and/or are stored in a ring memory.

13. The vehicle according to claim 11, wherein the first control unit is configured to:
store the data for manual guidance of the vehicle for a fixed interval before the recognized completion of manual guidance of the vehicle;
compare the stored data with previously stored manual guidance data from a fixed interval before a previously recognized completion of a manual guidance of the vehicle;
ascertain a preliminary parking data set for a defined parking position when the compared data for manual guidance of the vehicle match based on the matching data for manual guidance of the vehicle; and
output the input request in the starting region of automated guidance of the vehicle to the defined parking position according to the preliminary parking data set and ascertaining the user input in response to the input request.

14. The vehicle according to claim 9, wherein the first control unit is configured to:
select a defined parking position as a navigation destination;
determine the position of the starting region of the ascertained parking data set in relation to the defined parking position based on GPS-assisted navigation;
execute route guidance to reach the navigation destination; and
automatically guide the vehicle from the starting region to the defined parking position based on the trajectory information of the parking data set.

15. The vehicle according to claim 14, wherein the first control unit is configured to:
ascertain the GPS position of the vehicle at an end of the route guidance;
ascertain a relative spatial position of the vehicle to the starting region;
output driving instructions, based on the relative spatial position; and
initiate automated guidance of the vehicle when reaching the starting region.

16. The vehicle according to claim 14, wherein the first control unit is configured to:
ascertain a GPS position of the vehicle at an end of the route guidance;
ascertain a relative spatial position of the vehicle and a capture range of the defined parking position and outputting driving instructions based on the relative spatial position to a user; and
initiate automated guidance of the vehicle when reaching the capture range, wherein the capture range comprises an imaging area of imaging sensors of the vehicle along the trajectory from the starting region to the defined parking position.

17. A non-transitory computer program product comprising instructions which, when the computer program is executed by a control unit of a vehicle, cause the control unit to:
ascertain a user input relating to a defined parking position;
ascertain a parking data set for the defined parking position in response to the user input, the parking data set comprising:
  (a) a position of a starting region of automated guidance of the vehicle to the defined parking position, wherein the starting region is determined based on a GPS-assisted location of the vehicle;
  (b) trajectory information of an automated guidance of the vehicle from the starting region to the defined parking position, the trajectory information comprising
    (i) a plurality of odometry data relating to the lateral and longitudinal guidance of the vehicle along the trajectory, and
    (ii) surroundings data for a number of points along the trajectory comprising one or more of image data, a three-dimensional (3D) point cloud and/or structural data of a driving path of the trajectory,
guide the vehicle automatically from the starting region to the defined parking position in response to detecting the vehicle's position within the starting region, wherein the guidance is performed based on the trajectory information included in the parking data set.

18. The non-transitory computer program product according to claim 17, further comprising instructions which, when executed by the control unit of the vehicle, cause the control unit to: further comprising enable a user to make a correction to a recorded trajectory of the vehicle, wherein the correction is constrained to remain within the driving path defined by the captured image data.

19. The non-transitory computer program product according to claim 17, further comprising instructions which, when executed by the control unit of the vehicle, cause the control unit to:
  receive manual guidance of the vehicle;
  detect the manual guidance of the vehicle and storing detected data on the manual guidance of the vehicle for a sliding interval;
  recognize completion of the manual guidance of the vehicle at a parking position;
  output a request to the user to store the parking position as a defined parking position and ascertaining user input; and
  ascertain the parking data set for the defined parking position on the basis of the stored data for manual guidance data of the vehicle in response to the user input.

20. The non-transitory computer program product according to claim 19, wherein the stored data for manual guidance of the vehicle comprises odometry data, position data and image data of a driving path of the vehicle and/or are stored in a ring memory.

* * * * *